United States Patent
Chang et al.

(10) Patent No.: US 6,798,654 B2
(45) Date of Patent: Sep. 28, 2004

(54) WOOFER MODULE OF A PORTABLE COMPUTER

(75) Inventors: Hung-Yue Chang, Taipei Hsien (TW); Chu-Chia Tsai, Taipei Hsien (TW); Shu-Hsien Chu, Taipei Hsien (TW); Chien-Te Li, Taipei Hsien (TW); Wen-Chi Chen, Taipei Hsien (TW); Jin-Ming Chen, Taipei Hsien (TW); Sung-Chan Huang, Taipei Hsien (TW); Tung-Yang Li, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 0 days.

(21) Appl. No.: 10/249,153

(22) Filed: Mar. 19, 2003

(65) Prior Publication Data

US 2004/0062001 A1 Apr. 1, 2004

(30) Foreign Application Priority Data

Sep. 26, 2002 (TW) ..................................... 91215262 U (51) Int. Cl.$^7$ ................................................ G06F 1/16
(52) U.S. Cl. ....................................... 361/686; 361/683
(58) Field of Search ........................... 361/695, 685–686

(56) References Cited

U.S. PATENT DOCUMENTS 5,523,524 A * 6/1996 Prokisch et al. ............ 181/156

* cited by examiner

Primary Examiner—Yean-Hsi Chang
(74) Attorney, Agent, or Firm—Winston Hsu (57) ABSTRACT

A woofer module is used for outputting a low-frequency audio signal, and can be inserted into and removed from an expansion slot of a portable computer. The woofer module has a housing, a speaker unit positioned inside the housing for generating the audio signal, a predetermined space positioned inside the housing for resonating the audio signal, and a bass reflex duct positioned inside the housing which is connected to an output vent of the predetermined space and an output vent of the housing for transmitting the audio signal from the output vent of the housing to an ambient environment.

13 Claims, 9 Drawing Sheets

WOOFER MODULE OF A PORTABLE COMPUTER

BACKGROUND OF INVENTION

1. Field of the Invention

The invention relates to a woofer module, and more particularly, to a removable woofer module of a portable computer.

2. Description of the Prior Art

Figure 1:
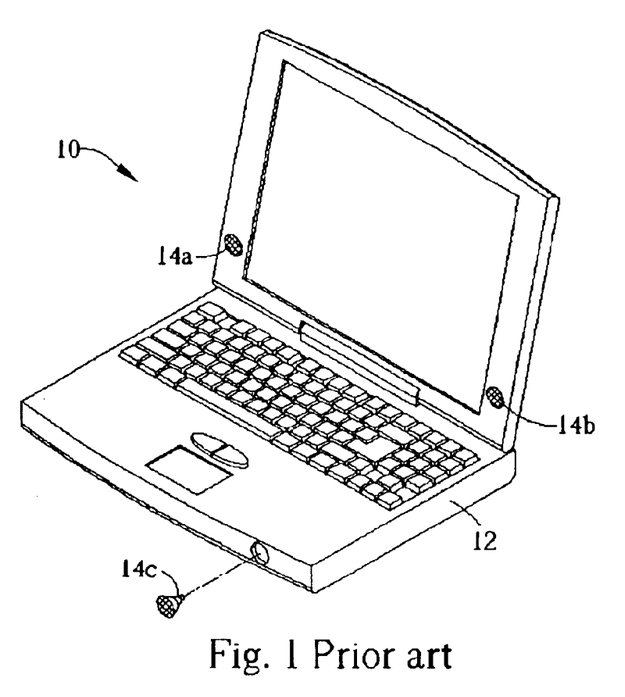
FIG. 1 is a diagram of a first prior art portable computer.

Recently, multimedia technology becomes so popular that a user can interact with a computer system to efficiently access variety of desired audio data and image data. Therefore, how to make a portable computer providing the user with amazing audio effects has become a key concern for computer manufacturers. Please refer to FIG. 1, which is a diagram of a first prior art portable computer 10. The portable computer 10 has a housing 12 and a plurality of speakers 14a, 14b, 14c. The speakers 14a, 14b respectively correspond to a left channel and a right channel for generating stereo sound. In addition, the speaker 14c is a woofer used to generate low-frequency signals. To make output signals generated by the speaker 14c to have lower frequencies, the portable computer 10 has to comprise a cavity for resonating the output signals generated from the speaker 14c. Only the existing spare space inside the interior of the portable computer 10 can be utilized to install the speaker 14c in conjunction with the required resonating cavity. In addition, the speaker 14c is fixed in the portable computer 10 at a predetermined location, that is, the speaker 14c is not designed to be a removable module. When the speaker is in unused state, the occupied space cannot be freed for other purposes.

Figure 2:
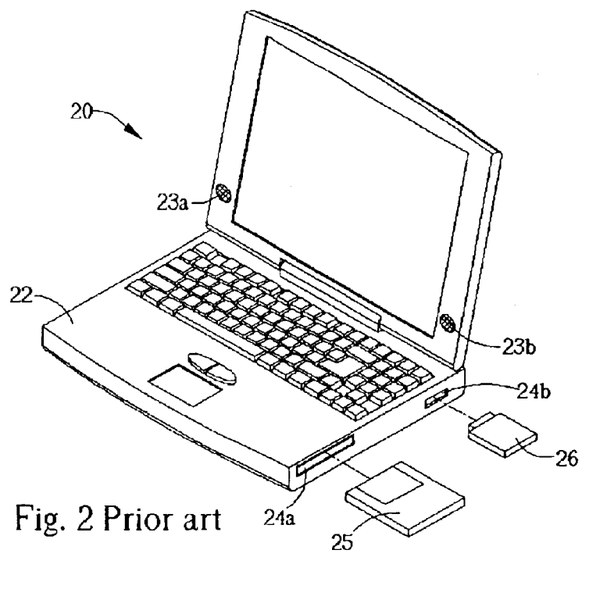
FIG. 2 is a diagram of a second prior art portable computer.
Figure 3:
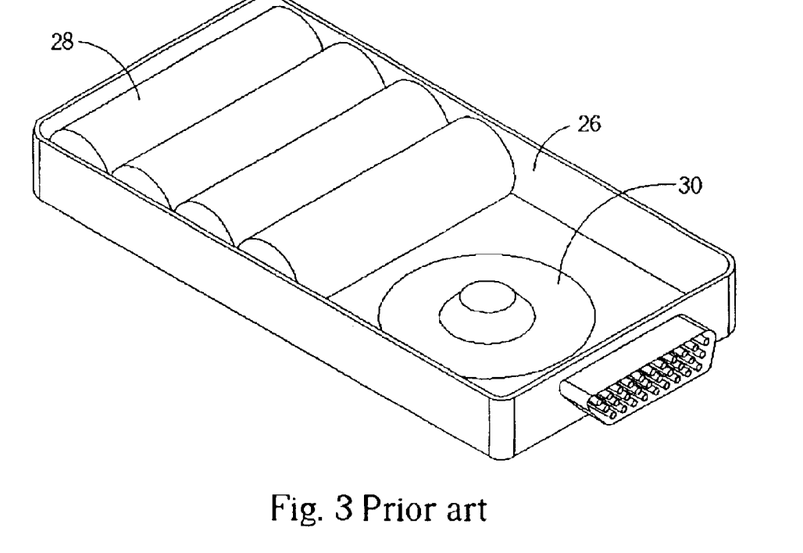
FIG. 3 is a diagram of a power module shown in FIG. 2.

Please refer to FIG. 2 in conjunction with FIG. 3. FIG. 2 is a diagram of a second prior art portable computer 20. FIG. 3 is a diagram of a power module 26 shown in FIG. 2. The portable computer 20 has a housing 22, which is also referred to as a first housing, two speakers 23a, 23b, two expansion slots 24a, 24b, a hard-disk drive 25, and a power module 26 (batteries for example). The expansion slots 24a, 24b are respectively used to install expansion devices such as the hard-disk drive 25 and the power module 26. Two speakers 23a, 23b respectively correspond to a left channel and a right channel for generating stereo sound. The power module 26 is installed in the expansion slot 24b and is removable from the expansion slot 24b. The power module 26 not only provides the portable computer 20 with a predetermined voltage used to power the portable computer 20, but also provides a function for outputting low-frequency signals. As shown in FIG. 3, the power module 26 includes a battery device 28 and a woofer 30. The battery device 28 is used to output the predetermined voltage, and the woofer 30 is used to output the low-frequency signal. There is a cavity located inside the housing of the power module 26 for the purpose of resonating the low-frequency signals generated from the woofer 30. Though the module design of woofer 30 couple with battery device 28 is efficient, but the power capacity provided by the battery device 28 is greatly reduced because of the additional woofer 30 in the power module 26. In other words, the battery life of the portable computer 20 is shortened due to the reduced power capacity. In addition, the cavity for resonating the signals is too narrow to make the signals have lower frequencies. It is noteworthy that the low-frequency signals outputted from the woofer 30 would generate noticeable vibration. The prior art portable computer 20 does not provide any devices to lessen or isolate the vibrations. When a hard-disk drive or an optical disk drive accesses the data, the data access operation is prone to be influenced by the vibrations causing the access to be corrupted or stopped. In addition, the vibrations make a disturbing noise while the user is using the portable computer.

SUMMARY OF INVENTION

It is therefore a primary objective of the claimed invention to provide a removable woofer module with shock-absorbing ability to solve the above-mentioned problem.

According to the claimed invention, a portable computer comprises a first housing having an expansion slot and a woofer module installed in the expansion slot for generating a low-frequency signal. The woofer module is removable from the expansion slot, and the woofer module comprises a second housing, a speaker unit positioned in the second housing for generating the low-frequency signal, a predetermined room positioned in the second housing for resonating the low-frequency signal, and a bass reflex duct positioned in the second housing. The bass reflex duct is used to connect an output vent of the predetermined room and an output vent of the second housing so that the low-frequency signal is outputted from the output vent of the second housing.

The claimed invention not only provides the portable computer with low-frequency signals, but also protects the portable computer from being disturbed by the vibration caused by the low-frequency signals.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
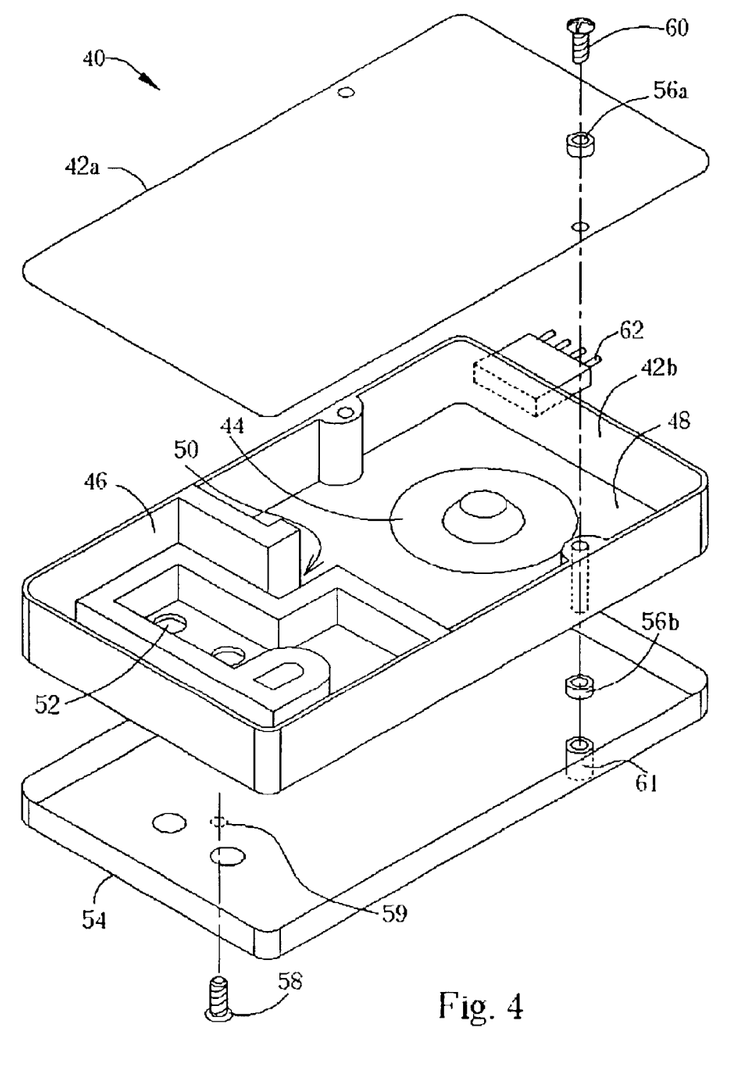
FIG. 4 is an exploded view of a first embodiment of a woofer module according to the present invention.
Figure 5:
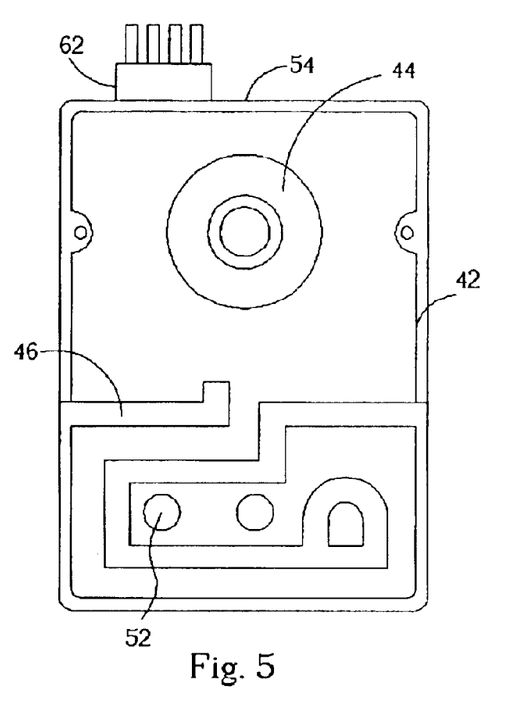
FIG. 5 is a top view of the woofer module shown in FIG. 4.
Figure 6:
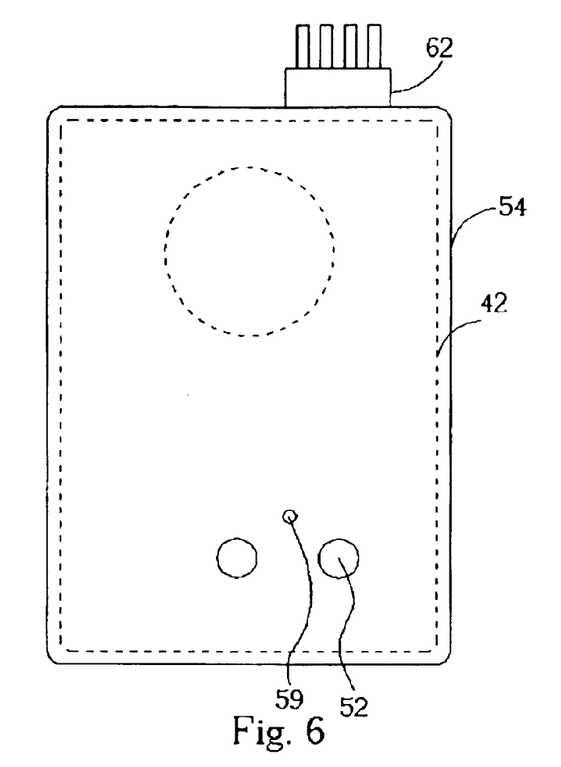
FIG. 6 is a bottom view of the woofer module shown in FIG. 4.

Please refer to FIG. 4, FIG. 5, and FIG. 6 in conjunction with FIG. 2. FIG. 4 is an exploded view of a first embodiment of a woofer module according to the present invention. FIG. 5 is a top view of the woofer module 40 shown in FIG. 4. FIG. 6 is a bottom view of the woofer module 40 shown in FIG. 4. The woofer module 40 has a housing 42, which is also referred to as a second housing, a speaker unit 44, and a bass reflex duct 46. The housing 42 has a top cover 42a and a bottom cover 42b, and a cavity is formed inside the housing 42. When the speaker unit 44 generates a low-frequency signal, the low-frequency signal resonates in the predetermined cavity 48 between the speaker unit 44 and the bass reflex duct 46. An air pressure surge is induced from the low-frequency signal to push the air inside the woofer module 40 and generates airflow so that the airflow enters the bass reflex duct 46 via an output vent 50 of the predetermined cavity 48. In the end, the airflow is outputted from the woofer module 40 thru the output vent 52. Based on the prior art of bass reflex principle, the low frequency extension of the woofer module 40 can be increased via bass reflex duct 46. In addition, the woofer module 40 is installed onto a chassis 54, which is also referred to as a third housing. The size of the chassis 54 corresponds to that of the expansion slot 24a or 24b shown in FIG. 2. The woofer module 40 installed on the chasis 54 is inserted into the expansion slot 24a or 24b so that the woofer module 40 is electrically connected to the portable computer 20. As mentioned before, the vibrations and noise occur when the speaker unit 44 generates the low-frequency signals. If the vibrations are transferred to the portable computer 20, some internal devices may not operate properly. The present embodiment, therefore, uses rubber rings 56a, 56b or other shock-absorbing materials to prevent the vibrations, which are generated from the woofer module 40, from being transferred to the chassis 54. Because the chassis 54 and the expansion slot 24a or 24b are connected and fixed through a screw 58 and a corresponding hole 59, if the vibrations generated from the woofer module 40 transmit to the chassis 54, the vibrations are further transmitted to the whole portable computer 20 through the screw 58 and the corresponding hole 59. Therefore, when a screw 60 fastens the woofer module 40 and the chassis 54 together via a corresponding hole 61, two enclosed rubber rings 56a, 56b are used to absorb vibrations generated from the woofer module 40. The disturbance caused by the vibrations is filtered out by the rubber rings 56a, 56b without affecting the chassis 54. In addition, the base reflect duct 46 has a connector 62 compatible to the interface of expansion slot 24a or 24b. For example, the portable computer 20 provides the speaker unit 44 with an appropriate, voltage via a PCMCIA interface.

Figure 7:
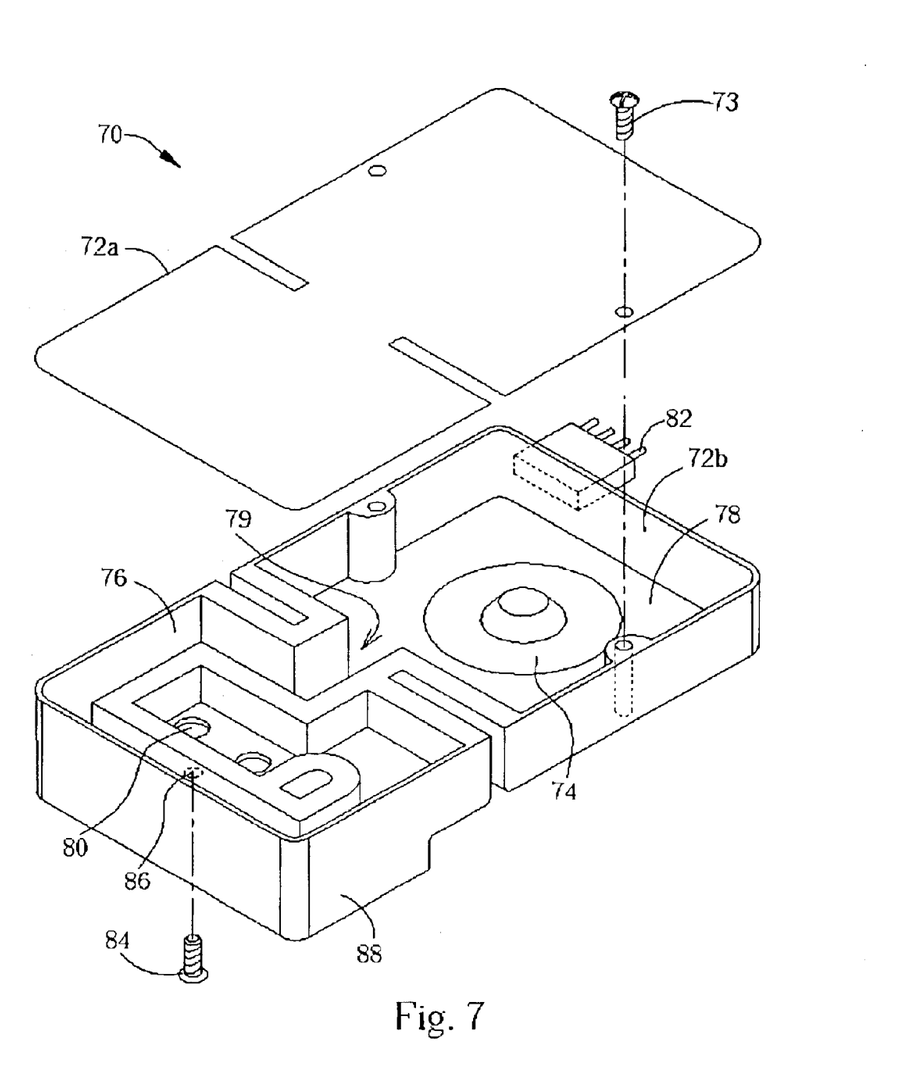
FIG. 7 is an exploded view of a second embodiment of a woofer module according to the present invention.
Figure 8:
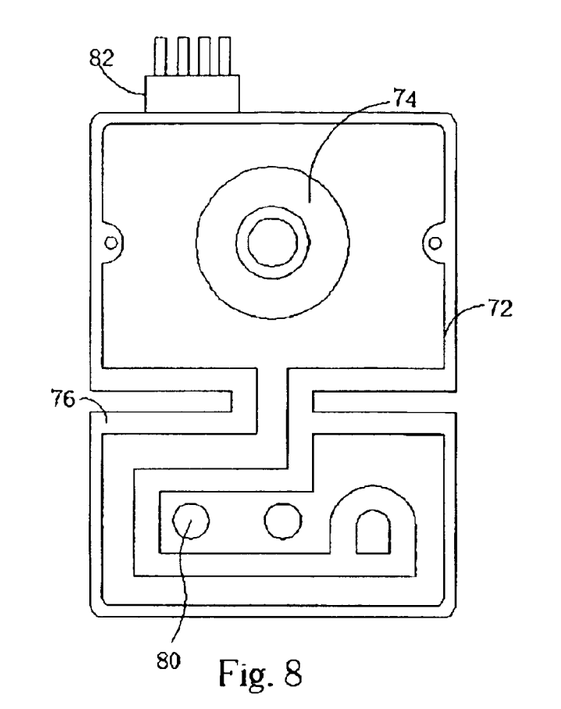
FIG. 8 is a top view of a woofer module shown in FIG. 7.
Figure 9:
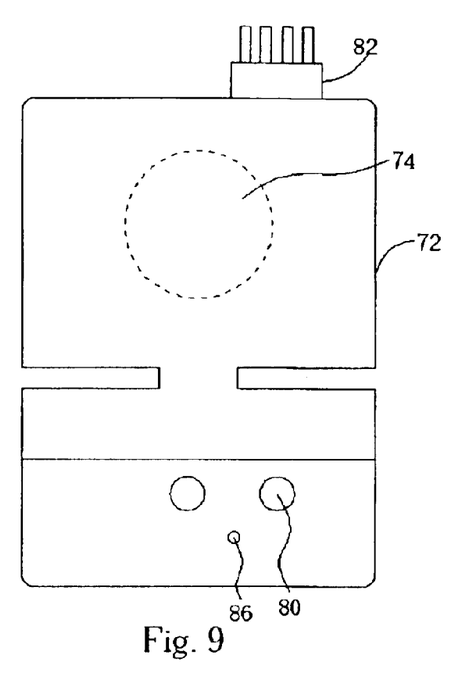
FIG. 9 is a bottom view of the woofer module shown in FIG. 7.

Please refer to FIG. 7, FIG. 8, and FIG. 9. FIG. 7 is an exploded view of a second embodiment of a woofer module according to the present invention. FIG. 8 is a top view of a woofer module 70 shown in FIG. 7. FIG. 9 is a bottom view of the woofer module 70 shown in FIG. 7. The woofer module 70 has a housing 72, a speaker unit 74, and a bass reflect duct 76. The housing 72 has a top cover 72a and a bottom cover 72b, and a cavity is formed inside the housing 72. A screw 73 is used to fasten the top cover 72a and the bottom cover 72b. When the speaker unit 74 generates the low-frequency signals, the low-frequency signals resonate in a predetermined cavity 78 between the speaker unit 74 and the bass reflect conduct 76. An air pressure surge is induced from the low-frequency signal to push the air inside the woofer module 70 and generates airflow so that the airflow enters the bass reflex duct 76 via an output vent 79 of the predetermined cavity 78. In the end, the airflow is outputted from the woofer module 70 thru the output vent 80. Based on the bass reflex principle, the low frequency extension of the woofer module 70 can be increased via bass reflex duct 76. In addition, the woofer module 70 has a connector 82 compatible to the interface of expansion slot 24a or 24b. The portable computer 20, therefore, provides the speaker unit 74 with an appropriate voltage via the interface. As mentioned before, the chassis 54 and the expansion slot 24a or 24b are connected and fastened through a screw 58 and a corresponding hole 59. In the present embodiment, the woofer module 70 is not installed onto a chassis 54 as shown in FIG. 4. In order to make the screw 84, which pierces housing of the portable computer 20, fasten the corresponding hole 86 located at the bottom cover 72b successfully, the housing 72 has a protruded portion 88 positioned under the bass reflect duct 76, and the hole 86 is positioned on the protruded portion 88. The screw 84, therefore, is capable of fastening the woofer module 70 and the corresponding expansion slot 24a or 24b with the help of the protruded portion 88. In other words, the protruded portion 88 takes the place of the chassis 54 shown in FIG. 4 to contact the expansion slot 24a or 24b so that the screw 84 works normally without the chassis 54. Please note that the housing 72, in the preferred embodiment, has a narrow portion corresponding a location where the bass reflect duct 76 is connected to the output vent 79 of the predetermined cavity 78. It is obvious that the predetermined cavity 78 and the bass reflect ducts 76 are connected through part of the housing 72 surrounding the output vent 79. Because a cross-section area of the narrow portion is inevitably small, and has a great flexibility accordingly, the vibrations generated from the speaker unit 74 are alleviated. As mentioned above, the hole 86 is positioned on the protruded portion 88, and the protruded portion 88 is located under the bass reflect duct 76. When the bass reflect duct 76 alleviates vibrations from the speaker unit 74, the shocks, which pass through the screw 84 and the corresponding hole 86, are simultaneously alleviated without disturbing the whole portable computer 20.

In contrast to the prior art, the claimed invention provides a removable woofer module that is compatible with an expansion slot positioned in a portable computer. The woofer module has a bass reflect duct used to increase the low frequency extension of the woofer module. In addition, the first embodiment of the claimed woofer module discloses a shock-absorbing apparatus such as a rubber ring for alleviating the vibrations transmitted to the expansion slot. The portable computer is protected against the shocks. As a result, the portable computer works properly. The second embodiment of the claimed woofer module discloses a flexible and narrow portion connecting the bass reflect duct and a resonance cavity so that the shocks are alleviated without affecting operation of the portable computer. To sum up, the claimed invention not only provides the portable computer with low-frequency signals, but also protects the portable computer from being disturbed by the vibrancies induced by the low-frequency signals. The claimed woofer module is capable of sharing the same expansion slot with other removable modules such as a floppy disk drive or a secondary hard-disk drive so that the utilization of limited spare space in the portable computer is more flexible.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A notebook computer comprising:
   a first housing having an expansion slot; and
   a woofer module installed in the expansion slot for generating a low-frequency signal, the woofer module capable of removing from the expansion slot, the woofer module comprising:
   a second housing;
   a speaker unit positioned in the second housing far generating the low-frequency signal;
   a predetermined room positioned in the second housing for resonating the low-frequency signal;

a bass reflex duct positioned in the second housing, the bass reflex duct being used for connecting an output vent of the predetermined room and an output vent of the second housing so that the low-frequency signal is outputted from the output vent of the second housing; and an absorbing member disposed on the second housing to alleviate the vibration caused by the woofer module.

2. The notebook computer of claim 1 wherein the woofer module further comprises:

a third housing; and at least a first support device for connecting the second housing the third housing, and the absorbing member.

3. The notebook computer of claim 2 wherein the expansion slot further comprises a second support device for connecting the third housing and the expansion slot.

4. The notebook computer of claim 3 wherein each of the first and second support devices is a screw.

5. The notebook computer of claim 1 wherein the absorbing member is a rubber ring, and the screw pierces through the rubber ring for connecting the second and third housings.

6. The notebook computer of claim 1 wherein the second housing comprises a narrow portion that corresponds to a location where the bass reflex duct is connected to the output vent of the predetermined room, and the narrow portion of the second housing is more flexible than other portions of the second housing.

7. The notebook computer of claim 6 wherein the expansion further comprises a support device for connecting the second housing and the expansion slot, and the support device is connected to a portion of the second housing that corresponds to the bass reflex conduct.

8. A woofer module of a notebook computer for generating a low-frequency signal, the notebook computer comprising a first housing having an expansion slot, the woofer module installed in the expansion slot for generating a low-frequency signal, the woofer module capable of removing from the expansion slot, the woofer module comprising a second housing;

a speaker unit positioned in the second housing for generating the low-frequency signal;

a predetermined room positioned in the second housing for resonating the low-frequency signal;

a bass reflex duct positioned in the second housing, the bass reflex duct being used for connecting an output vent of the predetermined room and an output vent of the second housing so that the low-frequency signal is outputted from the output vent of the second housing; and an absorbing member disposed on the second housing to alleviate the vibration caused by the woofer module.

9. The woofer module of claim 8 further comprising:

at least a first support device for connecting the first housing, the second housing, and the absorbing member.

10. The woofer module of claim 9 wherein each of the first support devices is a screw.

11. The woofer module of claim 8 wherein the absorbing member is a rubber ring, and the screw pierces through the rubber ring for connecting the second and third housings.

12. The woofer module of claim 8 wherein the second housing comprises a narrow portion that corresponds to a location where the bass reflex duct is connected to the output vent of the predetermined room, and the narrow portion of the second housing is more flexible than other portions of the second housing.

13. The woofer module of claim 12 wherein the expansion further comprises a support device for connecting the second housing and the expansion slot, and the support device is connected to a portion of the second housing that corresponds to the bass reflex conduct.

* * * * *